United States Patent [19]
Murphy

[11] Patent Number: 5,653,459
[45] Date of Patent: Aug. 5, 1997

[54] TRANSPORTABLE MODULAR LANDING ASSEMBLY FOR A TRAILER

[76] Inventor: Peggy R. Murphy, 901 N. Main St., Bourbon, Ind. 46504

[21] Appl. No.: 505,875

[22] Filed: Jul. 24, 1995

[51] Int. Cl.$^6$ .................................................. B60R 3/02
[52] U.S. Cl. ........................... 280/166; 280/656; 182/84; 182/113
[58] Field of Search ..................... 280/163, 164.1, 280/166, 656; 182/83, 84, 85, 86, 113; 296/162

[56] References Cited

U.S. PATENT DOCUMENTS

| | | | |
|---|---|---|---|
| 3,462,170 | 8/1969 | Smith et al. | 280/166 |
| 3,693,754 | 9/1972 | Butler | 182/86 |
| 3,750,351 | 8/1973 | Greenburg | 52/64 |
| 3,796,456 | 3/1974 | Bergeson et al. | 296/23 |
| 3,912,298 | 10/1975 | Humphrey | 280/166 |
| 4,909,700 | 3/1990 | Fontecchio | 414/549 |

FOREIGN PATENT DOCUMENTS

| 2368388 | 5/1978 | France | 280/166 |
|---|---|---|---|

*Primary Examiner*—Robert I. Oberleitner
*Assistant Examiner*—Avraham Lerner
*Attorney, Agent, or Firm*—R. Tracy Crump

[57] ABSTRACT

A modular landing assembly for a commercial trailer, which is transportable with the trailer is disclosed. The landing assembly includes a landing platform pivotally connected to the sidewall of the trailer, a detachable staircase, a detachable safety railing, and a storage frame mounted beneath the undercarriage of the trailer for carrying the staircase and safety railing. The landing platform can be pivoted between a vertical transportation position secured against the trailer side wall and a horizontal operational position extending from the trailer side wall. The landing platform includes a pair of folding legs, which support the landing platform in its operational position and which can be secured against the landing platform during transportation. The platform legs include an extensible foot, which allows the landing platform to be leveled. The staircase is a single unit, which is connected to the landing platform in its operational position by two pins. The detachable staircase also includes extensible feet for leveling the staircase with respect to the landing platform. The detachable safety railing includes three separate sections, which enclose the outer periphery of the landing and staircase. Each section includes a number of vertical posts, which are supported within tubular sleeves mounted to the landing platform and staircase.

8 Claims, 7 Drawing Sheets

TRANSPORTABLE MODULAR LANDING ASSEMBLY FOR A TRAILER

This invention reltes to a modular landing assemlby used with a trailer for ingress and egress into the trailer and has relevance to a modular landing assembly, which is conveniently transportable with the trailer.

BACKGROUND OF THE INVENTION

Commercial box style trailers ,are often used as mobile offices at construction sites. These box style trailers are equipped and furnished to allow construction personnel to monitor the construction of projects. Typically, the trailer body is constructed atop a wheeled undercarriage, which spaces the trailer flooring and entrance above the ground a distance such that a staircase and landing is required for ingress and egress. Heretofore, temporary trailer landings and staircases have been fabricated at each new trailer location. Refabricating a new landing and staircase at each new trailer location consumes man power, time and materials. Often, the landings and staircases are constructed from scrap materials from the job site and are discarded after use at a particular site. The logistics of transporting and reusing the make shift structures make their relocation impractical.

Various safety regulations, such as the regulation in the United States issued by the Occupational Safety and Health Agency (OSHA), typically govern the dimensions and construction of the landings and staircases used with construction trailers at a job site. Construction and dimension guidelines, which include load tolerances, stair rise and run requirements, and safety railing provisions, must be strictly observed. Often, the temporary landings and staircases fabricated on-site do not meet applicable safety regulations. Consequently, a reusable landing assembly that meets all safety regulations, is easily assembled and readily transportable with a commercial trailer is desirable.

SUMMARY OF THE INVENTION

The modular landing assembly of this invention eliminates the need for fabricating a new landing and staircase at each new trailer location. The modular landing assembly is readily transportable with the trailer and can be erected and leveled quickly with minimal manual labor. In addition, the modular landing assembly meets all federal safety guidelines.

The landing assembly includes a pivotal landing platform, a detachable staircase, a detachable safety railing, and a storage frame mounted beneath the trailer's undercarriage. The landing platform is pivotally mounted to the trailer's sidewall immediately below the entrance way. The landing platform can be pivoted between a vertical transportation position secured against the trailer side wall and a horizontal operational position extending from the trailer side wall. In the transportation position, the landing platform covers the entrance way to prevent trespass into the trailer as an additional security measure. The landing platform includes a pair of folding legs, which support the landing platform in its operational position and which can be secured against the landing platform during transportation. The platform legs include an extensible foot, which allows the landing platform to be leveled. The staircase is a single unit, which is connected to the landing platform in its operational position by two pins. The detachable staircase also includes extensible feet for leveling the staircase with respect to the landing platform. The detachable safety railing includes three separate sections, which enclose the outer periphery of the landing and staircase. Each section includes a number of vertical posts, which are supported within tubular sleeves mounted to the landing platform and staircase. The storage frame allows the detachable staircase and railing to be easily stored beneath the trailer's undercarriage for convenient transportation.

Accordingly, an advantage of this invention is to provide a reusable landing assembly for safe ingress and egress to a commercial trailer.

Another advantage of this invention is to provide a landing assembly which is conveniently transportable with a trailer.

Another advantage of this invention is that the transportable landing assembly is easily erected and disassembled with minimal manual labor.

Another advantage of this invention is that the transportable landing assembly includes safety features required by various regulatory bodies.

Other advantages will become apparent upon a reading of the following description.

BRIEF DESCRIPTION OF THE DRAWINGS

The preferred embodiment of the invention has been depicted for illustrative purposes only wherein.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize its teachings.

The figures show the transportable landing assembly 10 of this invention and a conventional commercial box trailer 2. As shown in FIGS. 1, 4–6, trailer 2 includes a wheeled undercarriage 4 and an enclosed rectangular trailer body 6 built atop of the undercarriage. Undercarriage 4 runs the length of trailer 2 and rides on a wheel and axial assembly 5. Trailer body 6 has an entrance way, which is formed in one of its side walls 8 and enclosed by a door 9. As shown undercarriage 4 spaces trailer body 6 and entrance way above the ground. Landing assembly 10 is intended for use with a commercial box trailer, but it can be adapted for use with any mobile trailer whose entrance way is elevated sufficiently from the ground to require an additional structure to gain access to the entranceway. As shown in FIGS. 1–5, transportable landing assembly 10 includes a rectangular landing platform 20, detachable staircase 40, detachable safety railings 60 and storage frame 80 mounted beneath undercarriage 4 of trailer 2 to store the staircase and railings during transportation.

Figure 4:
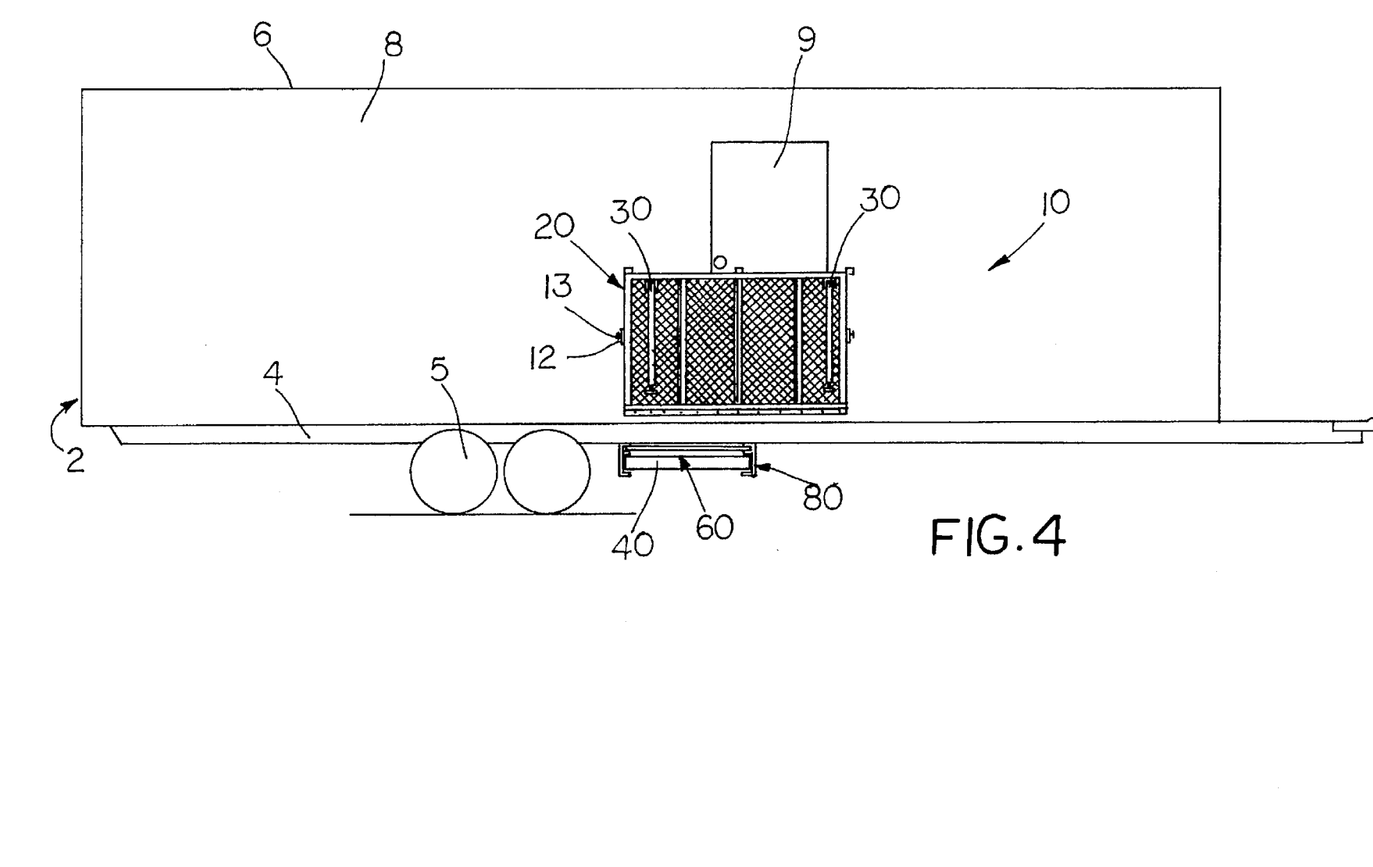
FIG. 4 is a side view of the trailer and the landing assembly showing the landing platform in its transportation position and the staircase and safety railings stored beneath the trailer undercarriage within the storage frame.

Landing platform 20 includes an expanded metal lattice 24 supported by end members 21, side members 22 and three cross members 23. Two laterally spaced tabs 26 extend from the stair side end member 21. Each tab 26 has a central eyelet 27. The outer side member 22 includes three laterally spaced railing post sleeves 28. Landing platform 20 is pivotally connected to trailer side wall 8 by a hinge 29. As shown, hinge 29 is a double leaf hinge, which extends the length of side member 22. Landing platform 20 is mounted to trailer 2 directly under entrance way. Landing platform 20 also includes two folding legs 30. Landing legs 30 are pivotally connected to the outer side members 22 by brackets 36 and pins 38. Bracket 36 has two bores 37 in which pins 38 can be inserted, allowing the legs to be secured in an extended position (FIGS. 1–3, 5–6) or a folded position (FIG. 4). Each leg 30 includes an inset block 31 and an extensible foot 32, which allows landing platform 20 to be leveled in its operational position. Block 31 is mounted to the distal end of each leg 30. Foot 32 includes a plate and threaded shaft 33, which is turned into a threaded bore in block 31 and an end plate 34.

Figure 1:
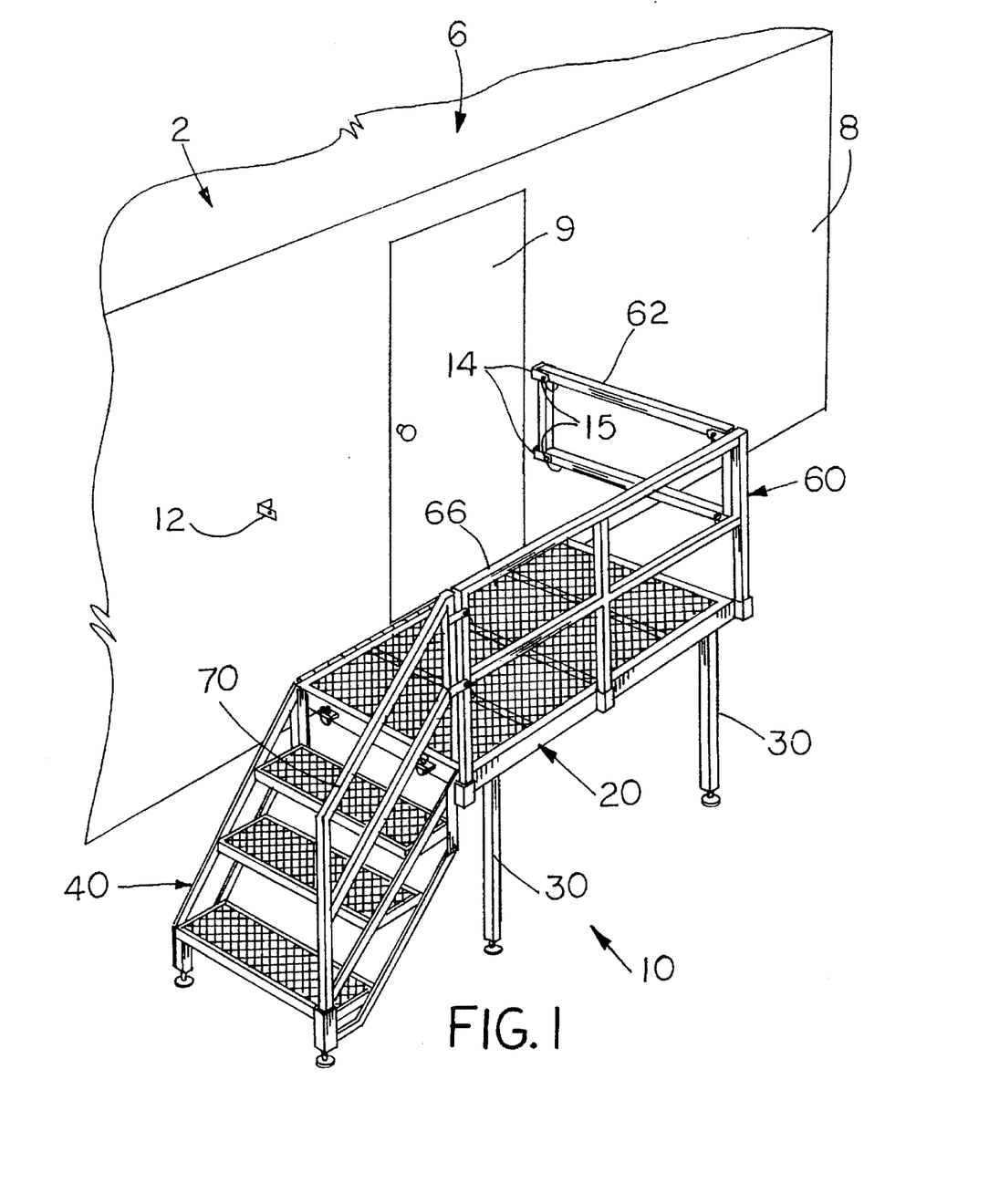
FIG. 1 is a perspective view of the landing assembly of this invention mounted to a conventional commercial trailer.
Figure 2:
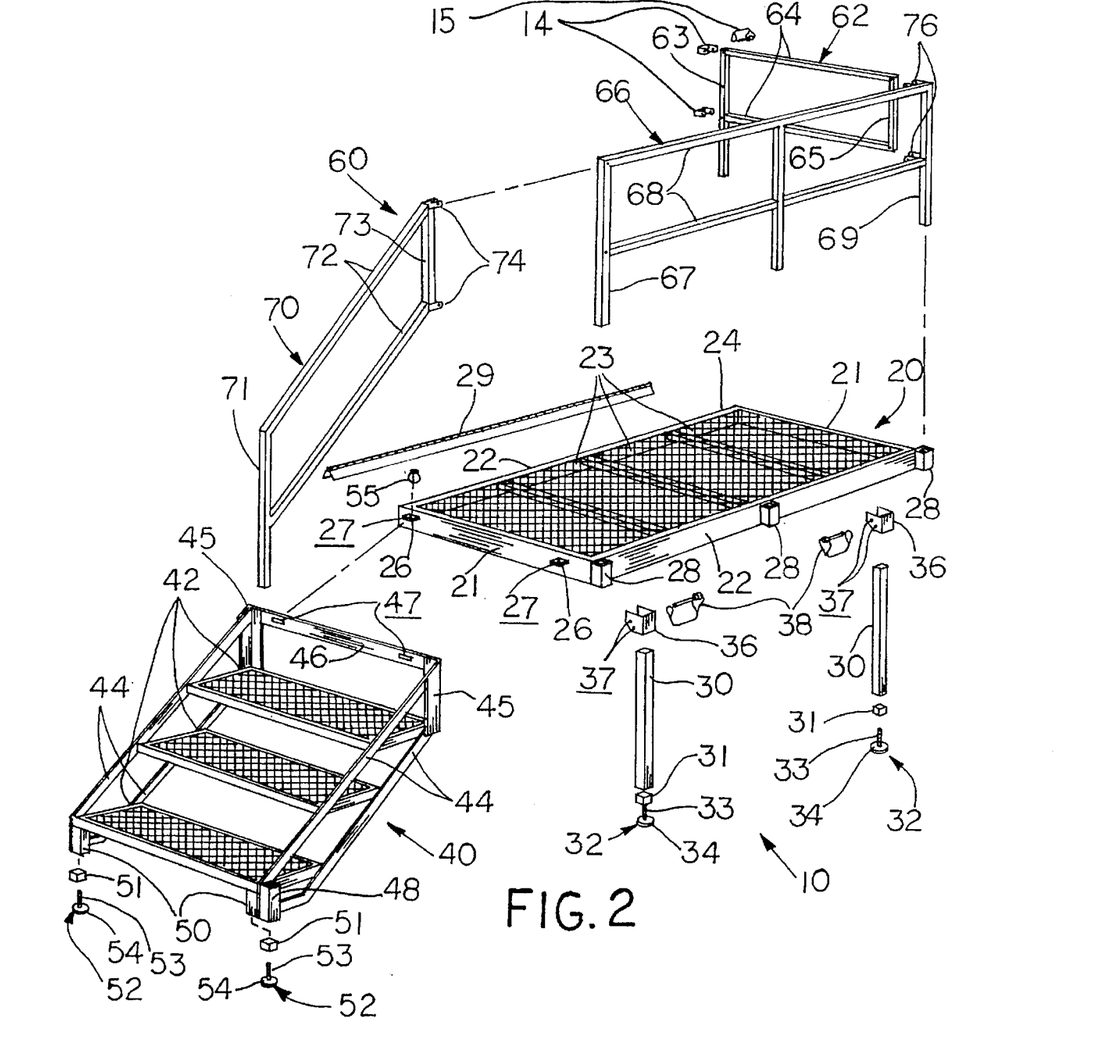
FIG. 2 is an exploded view of the landing assembly.
Figure 3:
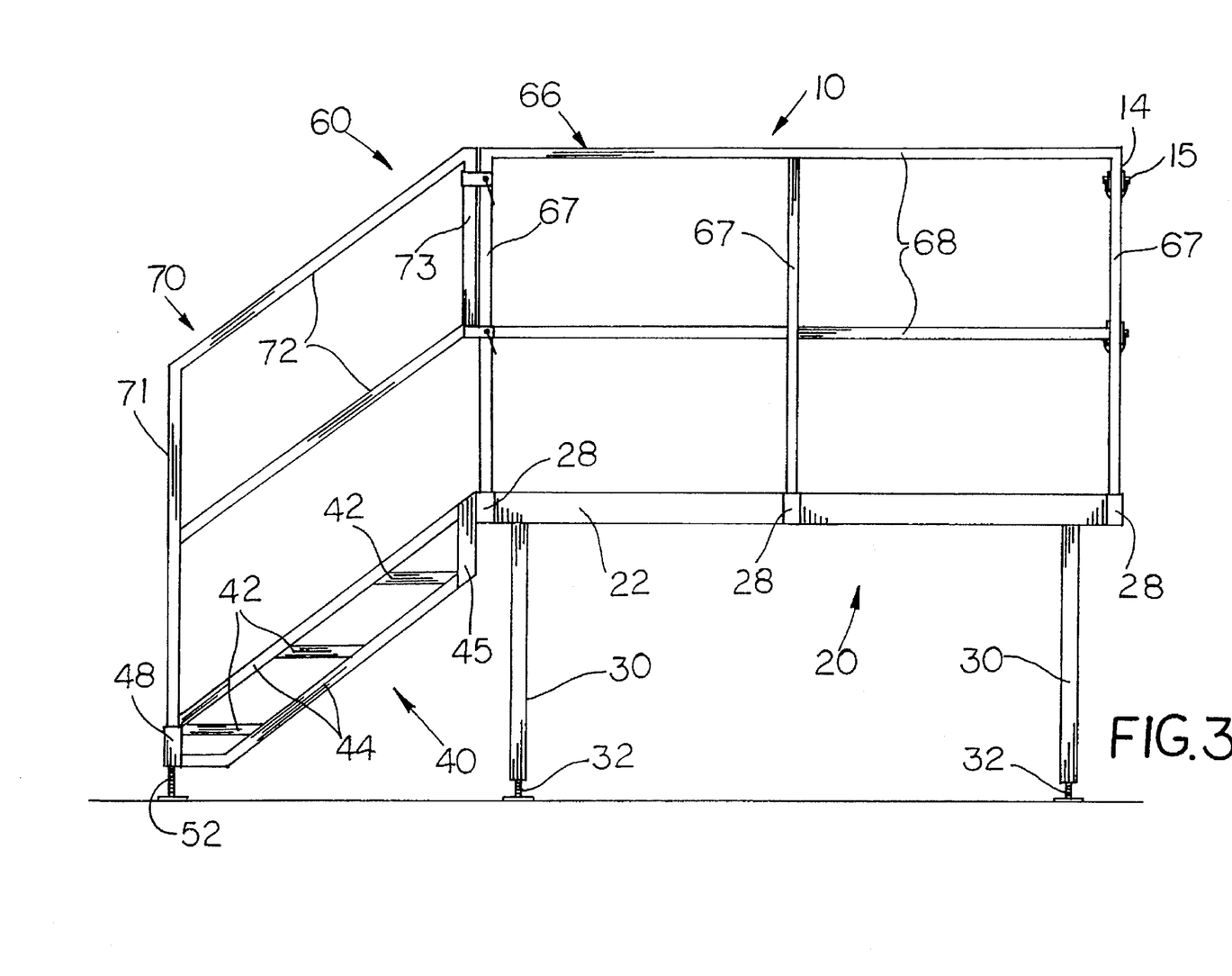
FIG. 3 is a side view of the landing assembly in an operational position.

Staircase 40 is a single unit and generally includes three fixed steps 42, although the number of steps may vary as long as the specifications fall within the applicable safety regulations. Steps 42 have a front edge and back edge and flat top surface. Parallel side members 44 are connected to the ends of each step 42 so that when staircase 40 is connected to landing platform 20, the tops of the steps are substantially parallel to the ground. The incline of parallel side members 44 define the rise and run of staircase 40 when connected to landing platform 20. Parallel side members 44 are joined at their upper ends by corner members 45. A back member 46 extends between corner members 45 and has two laterally spaced slots 47. A railing post sleeve 48 is secured to side members 44 mounted at the foot of staircase 40. Staircase 40 also includes two short tubular legs 50. Each leg 50 includes a block 51 and an extensible foot 52, which allows the staircase 40 to be leveled. Block 51 is inset within the distal end of each leg 50. Foot 52 includes a threaded shaft 53, which is turned into a threaded bore in block 51 and an end plate 54.

Safety railing 60 includes three detachable sections: end section 62, side section 66 and staircase section 70. End railing section 62 includes two rails 64 connected between an end post 63 and an end member 65. Side railing 66 includes two side rails 68 and three vertical posts 67 and 69. The rear post 67 includes two connecting brackets 76, for securing side section 66 to end section 62. Staircase section 70 includes two diagonal side rails 72 connected between a vertical lower post 71 and an end member 73. End member 73 includes two connecting brackets 74 for securing staircase section 70 to side section 66.

Figure 7:
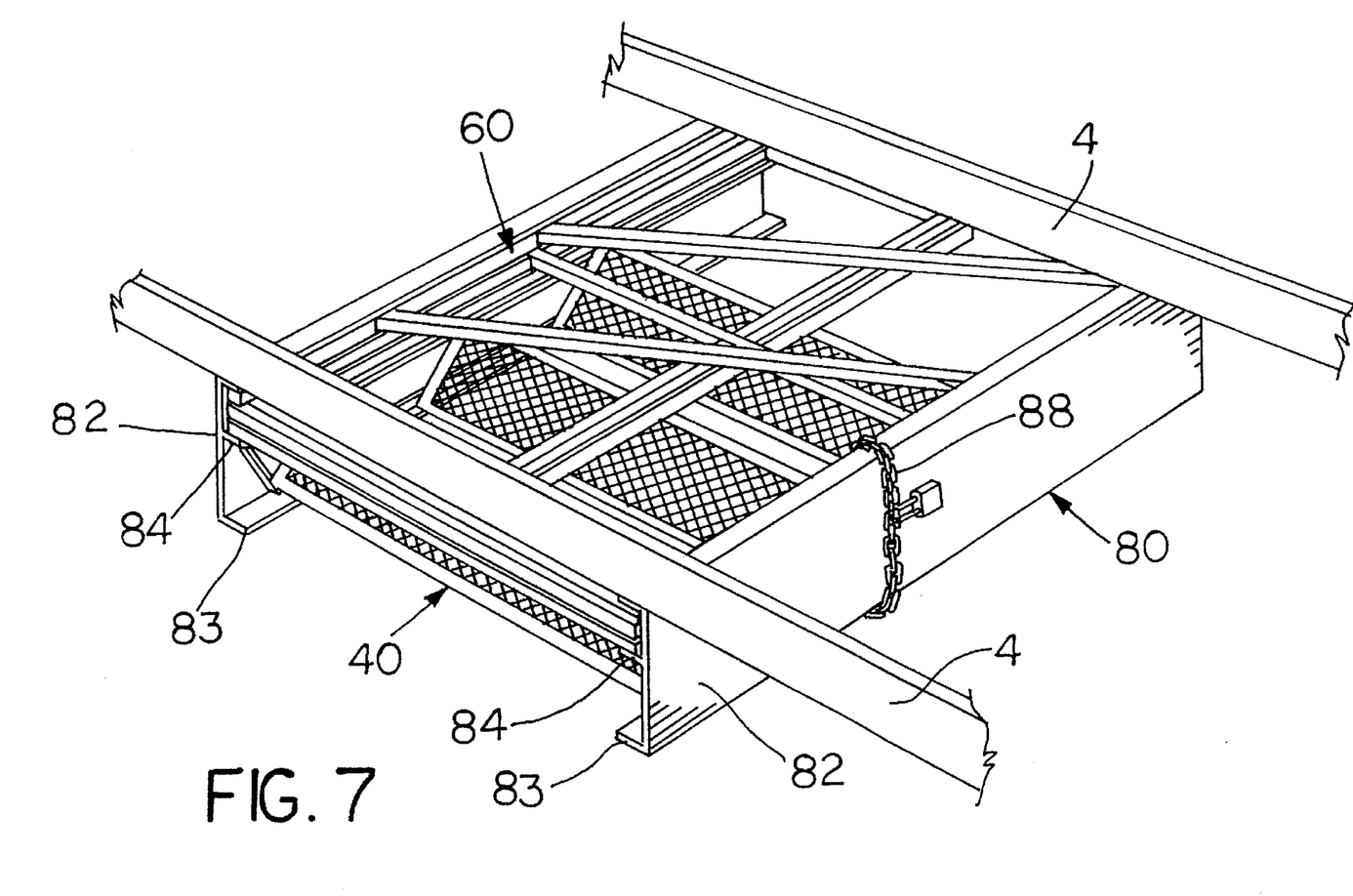
FIG. 7 is a fractional view of the staircase and safety railings stored within the storage frame underneath the trailer undercarriage.

As shown in FIG. 7, storage frame 80 includes two laterally spaced brackets 82. Each bracket 82 includes an end flange 83 and intermediate flange 84. As shown, staircase 40 is seated between brackets 82 atop end flange 83. Safety railing 60, when disassembled into its three sections, is seated between brackets 82 atop intermediate flange 84. Preferably, staircase 40 and railing 60 are secured within storage frame 80 by a chain 88 or other suitable method for preventing their loss during transportation.

Figure 5:
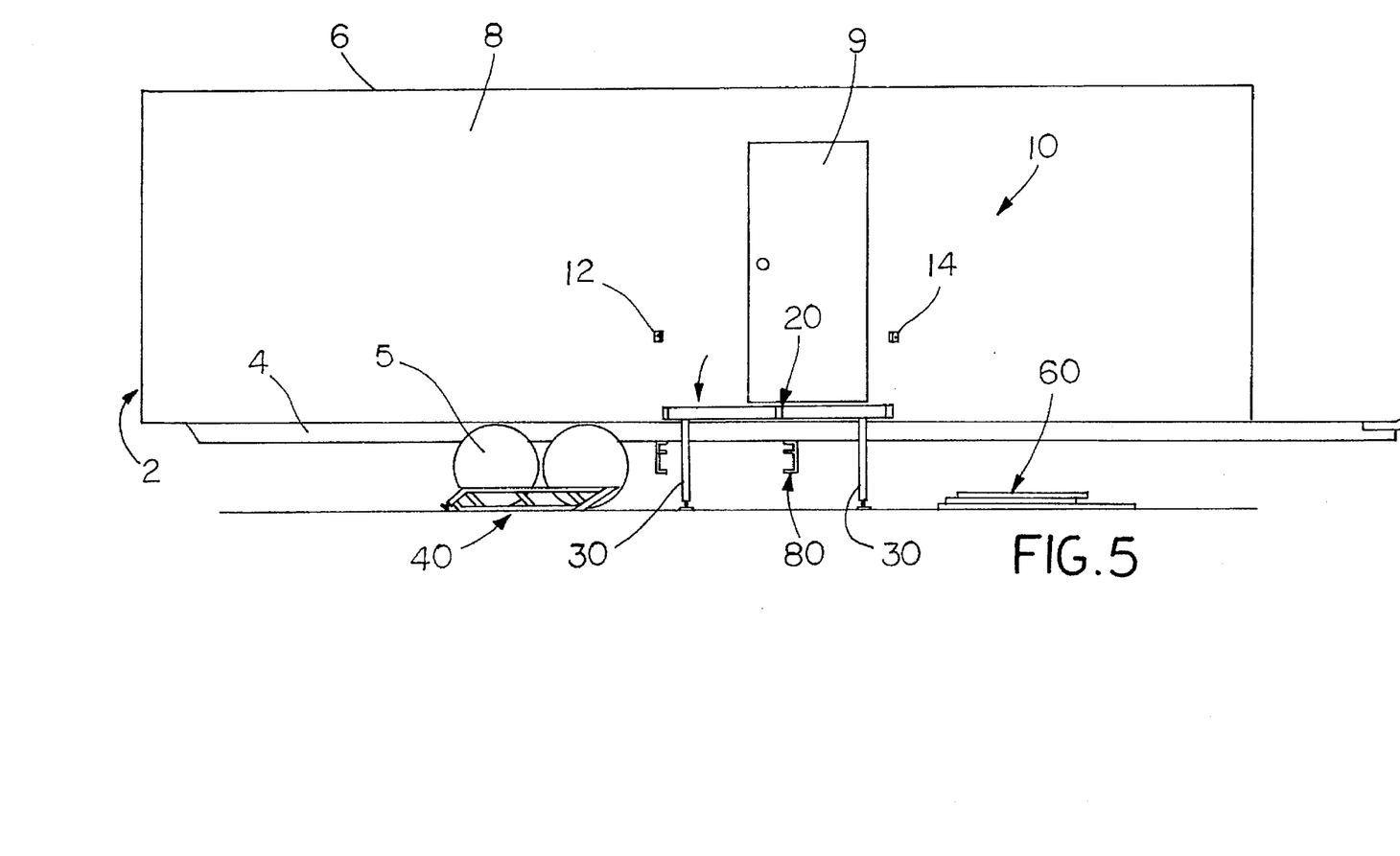
FIG. 5 is a side view of the trailer and landing assembly showing the landing platform in its operational position and the detached staircase and safety railing removed from their storage position beneath the trailer carriage.
Figure 6:
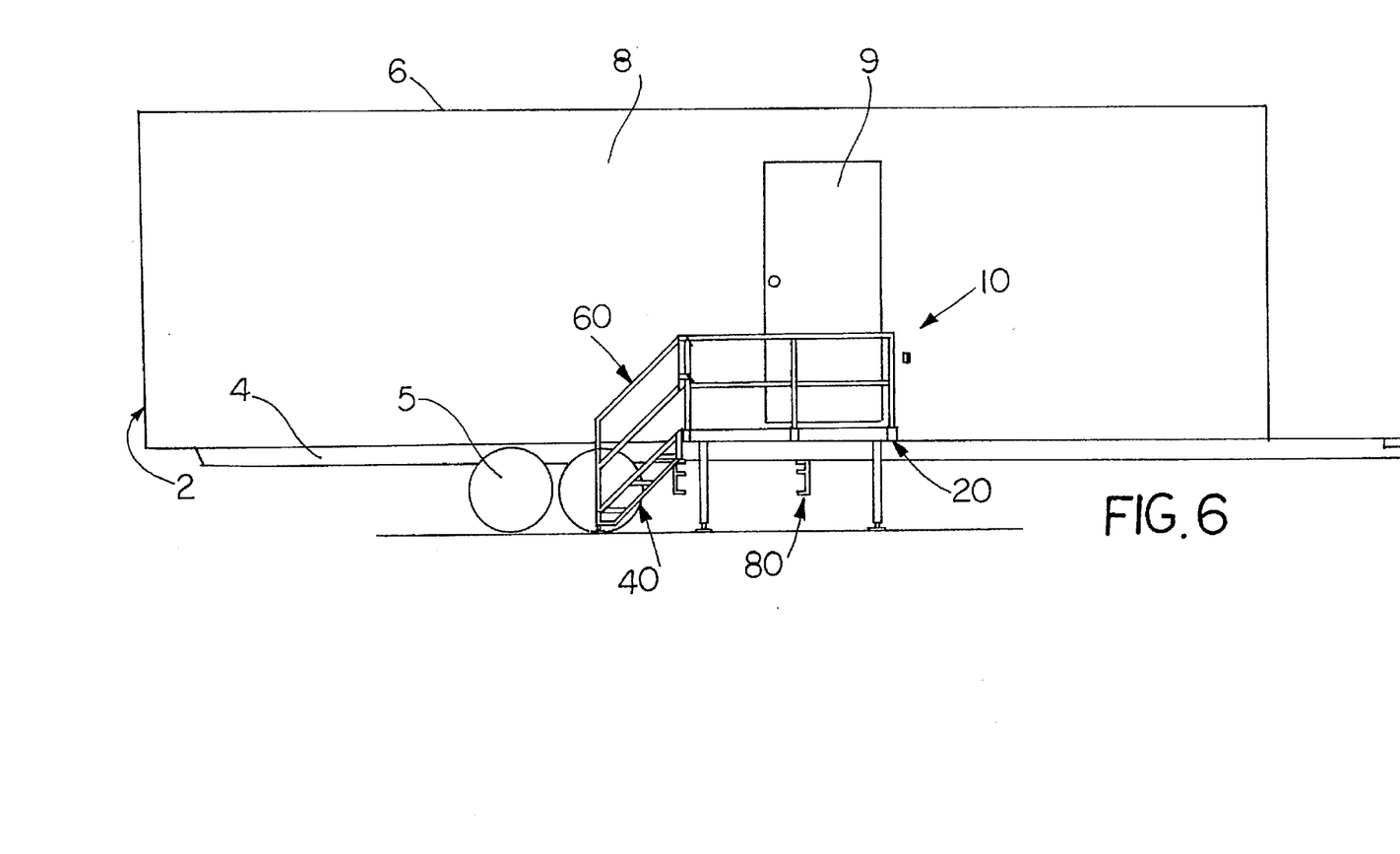
FIG. 6 is a side view of the trailer and the landing assembly showing the landing platform in its Operational position and the staircase and safety railings connected to the landing platform.

FIGS. 4–6 illustrate the transportation, assembly and use of landing assembly 10 with trailer 2. FIG. 4 shows the landing assembly dismantled for transportation. Landing assembly 10 is transportable with staircase 40 and railing 60 detached from landing platform 20 and stored within storage frame 80, with the landing platform secured in transportation position against trailer side wall 8. In the transportation position, landing platform 20 is secured against trailer side wall 8 by pins 13, which are inserted through a wall mounted bracket 12. Platform legs 30 are folded flat against landing platform 20 and secured in position by pins 38, which extend through bores 37 in bracket 36.

FIG. 5 illustrates an intermediate step in erecting landing assembly 10. Once trailer 2 is parked at the proper location, staircase 40 and railing 60 are removed from storage frame 80 and landing platform 20 is lowered to its horizontal operational position. To lower landing platform 20, pins 38 are first removed to allow platform legs 30 to be extended as the landing platform lowers. Next pin 13 is removed from bracket 12 to allow landing platform 20 to pivot downward. Pins 38 are reinserted to secure legs 30 in their extended position. Once landing platform 20 and legs 30 are in place, the landing platform can be leveled by retracting or extending foot 32 within block 31.

FIG. 6 shows landing assembly 10 in its operational position with staircase 40 and railing 60 in place on landing assembly 10. Staircase 40 is held to landing platform 20 by tabs 26, which extend through slots 47. Pins 55 are inserted through eyelets 27 to secure staircase 40 to landing platform 20. When connected, staircase 40 extends diagonally downward to the ground from landing platform 20. When properly secured to landing platform 20, staircase 40 is leveled by retracting or extending foot 52 within block 51. Finally, railing 60 is connected to landing platform 20 and staircase 40. End section 62 is connected to landing platform 20 by inserting end post 63 into its sleeve (not shown). The upper end of end post 63 is also secured to trailer side wall 8 by wall brackets 14 and fasteners 15. Next, side section 66 is connected to landing platform 20 by inserting end posts 67, 69 into their respective platform sleeves 28. Bracket 76 and fasteners (not shown) connect end member 65 of end section 62 to end post 67 of side section 66. Stair section 70 is connected to staircase 40 by inserting end post 71 into staircase sleeve 48. Brackets 74 and fasteners (not shown) connect end member 73 of staircase section 70 to end post 69 of side section 66.

It is understood that the above description does not limit the invention to the details given, but may be modified within the scope of the following claims,

I claim:

1. In combination a trailer and a modular landing assembly that is transportable with said trailer, said trailer including an undercarriage and exterior side walls and end walls defining an interior mounted atop said undercarriage, one of said side walls having an entrance way into said interior elevated above the ground, said landing assembly comprising:

a platform pivotally connected to said trailer adjacent said entrance way for movement between a transportation position wherein said platform abuts vertically against said trailer side wall over said entrance way and an operational position wherein said platform extends horizontally from said trailer, a staircase connectable to said platform for allowing access onto said platform, a safety railing connectable to said platform and said staircase for enclosing the outer periphery of said platform and said staircase and a storage frame mounted beneath said undercarriage for storing said staircase beneath said undercarriage during transportation of said trailer when detached from said platform and for permitting storage of said safety railing beneath said undercarriage during transportation of said trailer when detached from said platform and said staircase.

2. The combination of claim 1 wherein said storage frame includes two laterally spaced brackets, said staircase supported between said brackets during transportation of said combination.

3. The combination of claim 1 wherein said platform includes a leg for supporting said platform when said platform is in its said operational position, said leg being pivotally connected to said platform for movement between a folded position wherein said leg abuts against said platform and an extended position wherein said leg extends from said platform.

4. The combination of claim 3 wherein said leg includes means for leveling said platform when said platform is in its said operational position.

5. The combination of claim 1 wherein said platform includes a tab part, said staircase includes a back member having a slot, said tab part is insertable into said slot for connecting said staircase to said platform.

6. The combination of claim 1 wherein said staircase includes means for leveling said staircase when connected to said landing.

7. The combination of claim 1 wherein said safety railing means includes a plurality of posts, said platform and said staircase includes a plurality of tubular sleeves, each said railing post being insertable into a said sleeves to secure said railing means to said platform and said staircase.

8. In combination a trailer and a modular landing assembly that is transportable with said trailer, said trailer including an undercarriage and exterior side walls and end walls defining an interior mounted atop said undercarriage, one of said side walls having an entrance way into said interior elevated above the ground, said landing assembly comprising:

a platform pivotally connected to said trailer adjacent said entrance way for movement between a transportation position wherein said platform abuts vertically against said trailer side wall over said entrance way and an operational position wherein said platform extends horizontally from said trailer, a staircase connectable to said platform for allowing access onto said platform, and a storage frame mounted beneath said undercarriage for storing said staircase beneath said undercarriage during transportation of said trailer when detached from said platform, said platform includes a tab part, said staircase includes a back member having a slot, said tab part is insertable into said slot for connecting said staircase to said platform.

* * * * *